US012545137B2

(12) United States Patent
Murthy et al.

(10) Patent No.: US 12,545,137 B2
(45) Date of Patent: Feb. 10, 2026

(54) FAST CHARGER PROTECTION UNDER SUDDEN STOP CONDITIONS

(71) Applicant: Rivian IP Holdings, LLC, Irvine, CA (US)

(72) Inventors: Puneeth Srikanta Murthy, Irvine, CA (US); Lixiang Wei, Irvine, CA (US); Steven Schulz, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 247 days.

(21) Appl. No.: 18/228,092

(22) Filed: Jul. 31, 2023

(65) Prior Publication Data

US 2025/0042283 A1 Feb. 6, 2025

(51) Int. Cl.
*H02H 3/12* (2006.01)
*B60L 53/62* (2019.01)
*H02H 3/18* (2006.01)
*H02H 3/38* (2006.01)
*H02H 7/125* (2006.01)
*H02H 7/12* (2006.01)

(52) U.S. Cl.
CPC .............. *B60L 53/62* (2019.02); *H02H 3/12* (2013.01); *H02H 3/18* (2013.01); *H02H 3/38* (2013.01); *H02H 7/1213* (2013.01); *H02H 7/1252* (2013.01)

(58) Field of Classification Search
CPC .......... B60L 53/62; H02H 3/003; H02H 3/12; H02H 3/18; H02H 3/38; H02M 1/32; H02M 3/33573–33592
See application file for complete search history.

(56) References Cited

U.S. PATENT DOCUMENTS

| 3,784,893 A * | 1/1974 | Rando ................. H02H 7/1213 363/54 |
| 8,649,128 B2 * | 2/2014 | Wang ...................... H02M 1/32 361/18 |
| 10,615,691 B1 * | 4/2020 | Miller ....................... G05F 1/62 |
| 2011/0260617 A1 * | 10/2011 | Tanaka ................. H05B 45/385 315/307 |
| 2019/0006885 A1 * | 1/2019 | Danilovic ............... H02J 50/80 |

FOREIGN PATENT DOCUMENTS

| EP | 3471252 A1 * | 4/2019 | .............. B60Q 1/04 |
| EP | 3772152 A1 * | 2/2021 | .......... H02J 7/00714 |

OTHER PUBLICATIONS

Gorji et al., "Topologies and Control Schemes of Bidirectional DC-DC Power Converters: An Overview," in IEEE Access, vol. 7, pp. 117997-118019, 2019, doi: 10.1109/ACCESS.2019.2937239. (Year: 2019).*

* cited by examiner

*Primary Examiner* — Fred E Finch, III
(74) *Attorney, Agent, or Firm* — HG LAW LLP

(57) ABSTRACT

Systems and methods for operating a PEM including control circuitry are provided herein. The operation includes detecting, using the control circuitry, a drop in output current of the PEM, detecting, using the control circuitry, an increase in output voltage of the PEM, and in response to detecting the drop in output current and detecting the increase in output voltage, turning off the PEM using the control circuitry. Turning off the PEM may protect circuitry of the PEM from an interruption of a continuous power flow.

20 Claims, 10 Drawing Sheets

FAST CHARGER PROTECTION UNDER SUDDEN STOP CONDITIONS

INTRODUCTION

The present disclosure relates to managing power electronics equipment during power conversion operations and, more particularly, to systems and related processes for protecting power electronics equipment during a sudden interruption of power flow to a load.

SUMMARY

Power electronics modules (PEMs) are utilized to provide power conversion operations for multiple applications. One such application is an electric vehicle charging station, in which a PEM receives an AC voltage from a power grid, converts it to a DC voltage, and provides the converted DC voltage to a charging port of an electric vehicle. Another such application is in a battery charging station, in which the PEM provides the converted DC voltage to one or more battery packs. During operation of PEMs, it is possible that a sudden stop condition may occur, e.g., in response to a sudden interruption in the connection to the port receiving the DC voltage. In accordance with the present disclosure, in a sudden stop condition, the PEM quickly reacts to adjust its operating condition so that there is no accumulation of excess energy and so that failure events may be avoided.

In some embodiments, a control scheme is used to operate the PEM to enable it to react to sudden stop conditions. The control scheme may involve detecting output conditions of the PEM to identify a sudden stop condition, e.g., a sudden disconnection of an electric vehicle or battery pack that had been receiving power from the PEM. Conditions indicating a sudden stop condition may include a decrease in output current, an increase in output voltage, or any combination thereof. In response to identifying a sudden stop condition, the control scheme may modify one or more operating parameters of the PEM to, for example, prevent excess energy accumulation and the occurrence of failure events. Modifying one or more operating parameters may include turning off a switching element of the PEM, e.g., within a dual active bridge (DAB) converter in the PEM.

In some embodiments, at least two PEMs may be connected in parallel to provide a net power output. For example, two PEMs may charge a single electric vehicle or battery pack to achieve a faster charging rate than can be provided by a single PEM. In this configuration, another sudden stop condition that can be identified in accordance with the present disclosure includes a negative output current through one of the PEMs, which may be supplied by the other PEM connected in parallel.

In some embodiments, for improved response time, the present disclosure provides systems and methods for controlling a PEM independent of a main system controller. In the event of a sudden stop condition, the use of a main system controller may be too slow to prevent a failure event because excess energy may accumulate due to latency of electronic communication to and from the main controller. Accordingly, after responding to a sudden stop condition, a PEM may send a status signal to a main controller indicative of the occurrence of a sudden stop condition and the change in operating parameters that were executed to protect the electronics equipment.

In some embodiments, a method for operating a PEM including control circuitry is provided. The method includes detecting, using the control circuitry, a drop in output current of the PEM, detecting, using the control circuitry, an increase in output voltage of the PEM, and in response to detecting the drop in output current and detecting the increase in output voltage, turning off the PEM using the control circuitry. Turning off the PEM may protect circuitry of the PEM from an interruption of a continuous power flow.

In some embodiments, the PEM may include a DC-DC converter such as, for example, a DAB converter.

In some embodiments, turning off the PEM may include turning off a switching element of the DAB converter.

In some embodiments, the PEM may be a first PEM electrically coupled in parallel to a second PEM, the first and second PEMs may be configured to provide a net positive DC output current, where the drop in output current of the first PEM results in a negative output current. The method may further include turning off the first PEM using the control circuitry in response to detecting the negative output current.

In some embodiments, a main controller may monitor the first and second PEMs, and the method may further include transmitting a first PEM status signal to the main controller based on the first PEM being turned off. In response to receiving the first PEM status signal, the main controller may notify an external device of the first PEM status signal.

In some embodiments, the output current may be coupled to at least one of an energy storage device or a DC-AC converter In some embodiments, a method for operating a PEM includes detecting, using control circuitry, a negative current at an output of a first power electronics module (PEM) that is electrically coupled in parallel to a second PEM to provide a net positive DC output current, and in response to detecting the negative output current, turning off the first PEM using the control circuitry.

In some embodiments, a system for controlling a PEM including control circuitry is provided. The system includes the PEM and control circuitry of the PEM configured to detect a drop in output current of the PEM, detect an increase in output voltage of the PEM, and in response to detecting the drop in output current and detecting the increase in output voltage, turn off the PEM.

In some embodiments, the system also includes a main controller coupled to the PEM and at least one additional PEM, where the control circuitry of the PEM may be further configured to transmit a PEM status signal to the main controller based on the PEM being turned off. In response to receiving the PEM status signal, the main controller may be configured to notify an external device of the PEM status signal.

In some embodiments, the PEM is a first PEM coupled in parallel to a second PEM to provide a net positive DC output current, and the control circuitry of the first PEM may be further configured to detect a negative current at an output of the first PEM and, in response to detecting the negative output current, turn off the first PEM.

In some embodiments, the negative output current of the first PEM may occur when a load stops receiving the net positive DC output current and the second PEM continues providing a positive DC output current. The control circuitry of the first PEM may be configured such that turning off the first PEM protects circuitry of the first PEM from an interruption of a continuous power flow.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
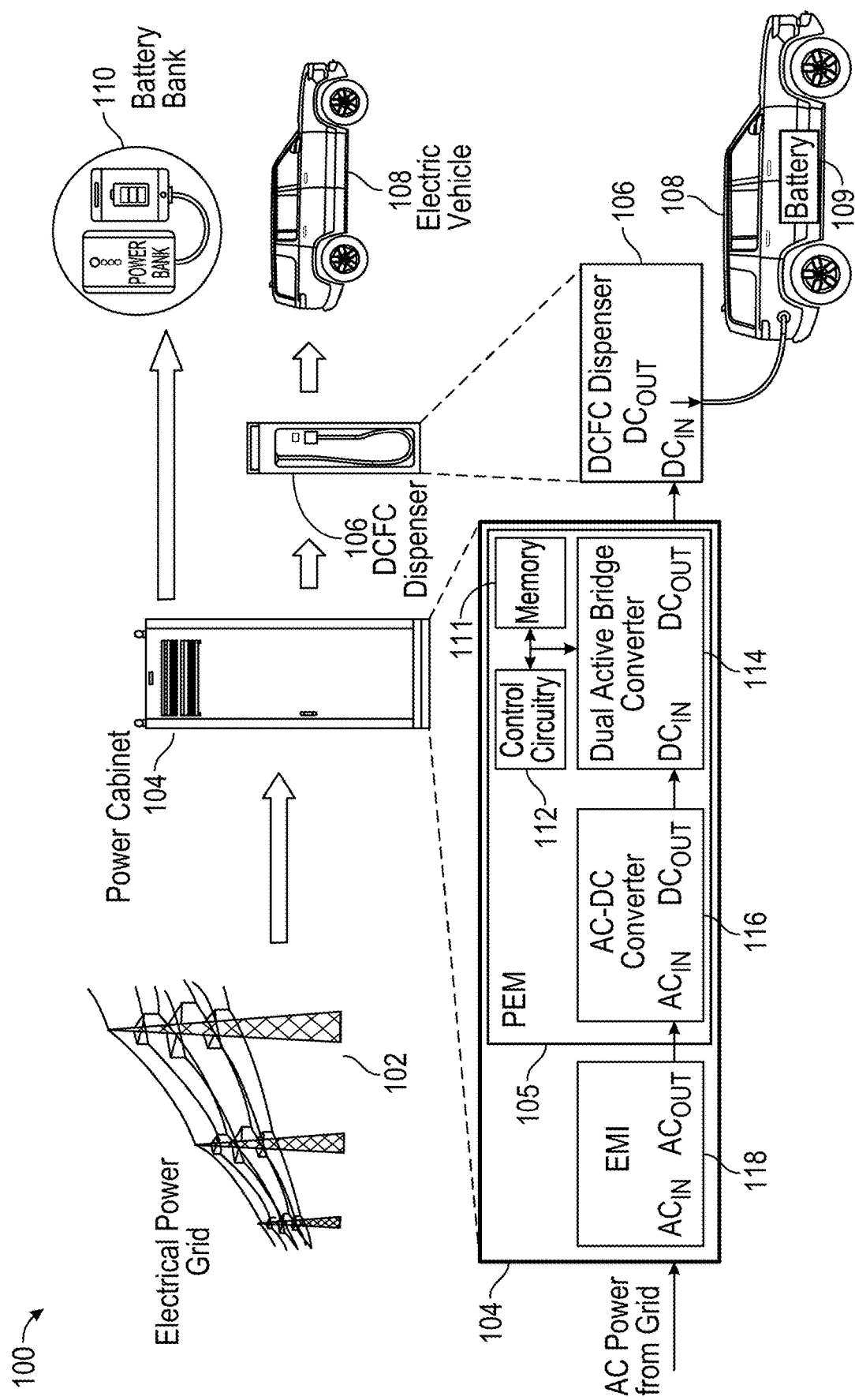
FIG. 1 shows an illustrative block diagram of an electric vehicle charging system including a PEM, in accordance with some embodiments of the disclosure.

In multiple applications, it is desirable to inject power into electrical energy systems, including to achieve fast charging of electric vehicles and battery packs. When charging DC power systems with power supplied by an AC electric grid, power electronic systems are used to at least convert the AC power to DC power and then couple the DC power to a receiving device. Such power electronic systems may be expensive, bulky, or difficult to repair. It may therefore be desirable to maintain the operational lifetime of these power electronic systems for as long as possible. Additionally, failure of such power electronic systems may cause damage to interconnected devices and infrastructure.

To improve the longevity of power electronics systems, it may be important to protect the system hardware from exposure to excessive power flows, e.g., over voltage or over current conditions. For example, an over voltage or over current condition may result in a failure event, which may damage the power electronics system. Therefore, provided herein are systems and related processes for preventing such failure events in power electronics systems.

Conditions that may give rise to a failure event may be denoted as sudden stop conditions. Sudden stop conditions may occur in response to a power flow being suddenly interrupted by, for example, a loss of connection to at least one of a power source or a load. For example, a sudden stop condition may result from an electric vehicle being suddenly unplugged from a fast DC charger or a contactor of the electric vehicle being suddenly opened in response to an onboard vehicle condition. In response to the sudden stop condition, a failure event of the PEM is reduced by rapidly turning off the PEM that receives input power, delivers output power, performs other power transfer operations, or any combination thereof. If the PEM is rapidly turned off, then the risk of a failure event may be mitigated or eliminated.

In some applications, it is desirable to connect multiple PEMs in parallel to serve one or more net power outputs. For example, a power cabinet may be equipped for fast electric charging of a single electric vehicle, simultaneous charging of multiple electric vehicles, charging of battery banks, or any combination thereof. Therein, it may be useful to include multiple PEMs within the power cabinet, such that faster charging can be realized for an individual device or multiple devices can be independently charged in parallel. In a parallel configuration, a sudden loss of connection to at least one load may cause net power output from a first PEM to flow back into a second PEM (i.e., the second PEM records a negative current flow). This negative current flow also represents a possible sudden stop condition that may be resolved by rapidly turning off the second PEM.

Provided herein are systems including one or more PEMs configured to output DC power. Each PEM includes control circuitry to monitor operating characteristics of the PEM. In response to detecting a sudden stop condition based on at least one operating characteristic of the PEM, the control circuitry is configured to turn off a power transfer component within the PEM (e.g., before an excess amount of energy can accumulate in the PEM or in any device coupled to the PEM). In response to turning off a component of the PEM or detecting the sudden stop condition, the control circuitry is also configured to transmit a PEM status signal to a main controller that may be configured to monitor one or more PEMs.

FIG. 1 depicts an illustrative block diagram 100 of an electric vehicle charging system including a PEM, in accordance with some embodiments of the disclosure. Power is input to the system by electrical power grid 102, which is coupled to power cabinet 104. Power cabinet 104 includes PEM 105, as shown in the exploded view, as well as other components. Power cabinet 104 is coupled to direct current fast charge (DCFC) dispenser 106, which ultimately delivers power to at least one of electric vehicle 108 (specifically battery 109 therein) and/or battery bank 110. As used herein, either of battery 109 or battery bank 110 may be referred to as an energy storage device. PEM 105 includes memory 111 and control circuitry 112, where memory 111 may include instructions for operating control circuitry 112 under various operations including regular charging and sudden stop conditions. PEM 105 also includes DAB converter 114, which conditions the DC power to be properly received by electric vehicle 108 or battery bank 110 through DCFC dispenser 106. Additionally included in PEM 105 is AC-DC converter 116, which converts incoming AC power from the electric grid to outgoing DC power for charging connected devices. The power cabinet 104 additionally includes electromagnetic interference (EMI) unit 118, which conditions power from electrical power grid 102 to be properly received by PEM 105. While power cabinet 104 is depicted as providing DC power to an energy storage device, power cabinet 104 may provide power to any type of load.

Figure 2:
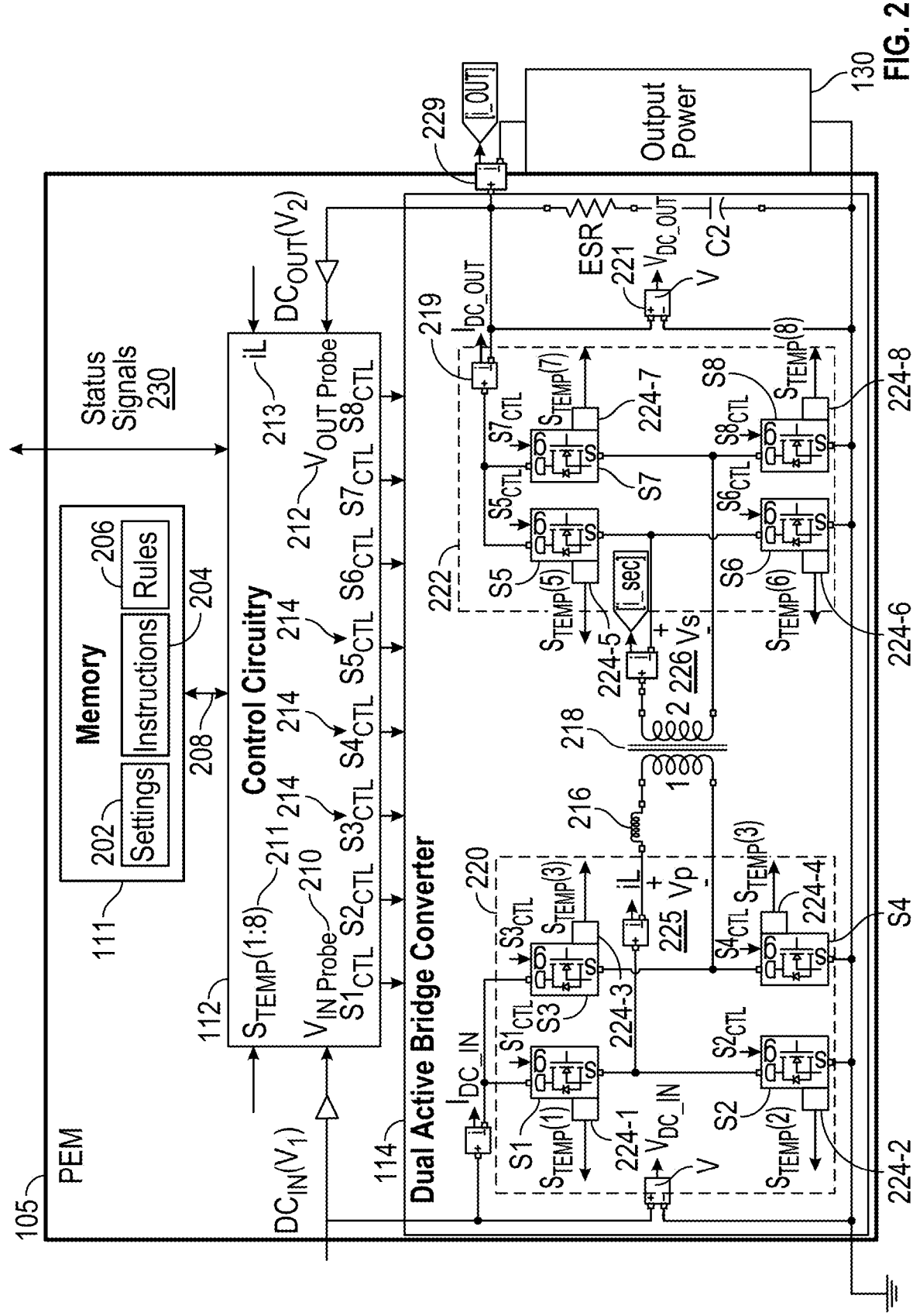
FIG. 2 is an illustrative block diagram showing additional details of some components of a PEM, in accordance with some embodiments of the disclosure.

FIG. 2 is an illustrative block diagram showing additional details of some components of PEM 105, in accordance with some embodiments of the disclosure. Memory 111 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Memory 111 may be used to store various types of instructions, rules, and/or other types of data. In some embodiments, control circuitry 112 executes instructions for an application stored in memory 111 (e.g., to implement one or more of a plurality of modules). Specifically, control circuitry 112 may be instructed by the application to perform the functions discussed herein. In some implementations, any action performed by control circuitry 112 may be based on instructions received from the application. For example, the application may be implemented as software or a set of executable instructions that may be stored in memory 111 and executed by control circuitry 112.

Memory 111, in some aspects, stores settings 202, instructions 204, and rules 206. Example types of settings 202 may include PEM output settings, DAB control settings, sudden stop detection settings, sudden stop response settings, other types of PEM settings, or any combination thereof. Example types of rules 206 include computational constants (e.g., properties of inductors, transformers, switches, transistors, or other electronics of PEM 105), overvoltage conditions, overcurrent conditions, negative current conditions, switching sequences, DAB models, DAB controls, other types of information or data, or any combination thereof. In some aspects, instructions 204 are executed by control circuitry 112 to implement steps of various methods described herein.

DAB converter 114 includes transformer 218, primary side bridge 220, and secondary side bridge 222. Primary side bridge 220 is coupled to a primary side of transformer 218 via series inductor 216. Secondary side bridge 222 is coupled to a secondary side of transformer 218. As used herein, the "primary side" or "primary bridge" of DAB converter 114 refers to the portion of DAB converter 114 appearing to the left of transformer 218 in FIG. 2, and the "secondary side" or "secondary bridge" of DAB converter 114 refers to the portion of DAB converter 114 appearing to the right of transformer 218 in FIG. 2. As used herein, Vp and Vs refer to the voltage on the primary side of transformer 218 and the voltage on the secondary side of transformer 218, respectively. DAB converter 114 also includes primary side switches S1, S2, S3, and S4 located on the primary side of DAB converter 114 and secondary side switches S5, S6, S7, and S8 located on the secondary side of DAB converter 114. Switches S1, S2, S3, S4, S5, S6, S7, and S8 may be any suitable type of electronic switch, such as a field effect transistor (FET)-based switch, that can be enabled (e.g., switched on/closed, during which current is permitted to be conducted between its source and drain terminal) or disabled (e.g., off/open, during which current is effectively prevented from being conducted between its source and drain terminal) by changing a logic level of the control signal provided to its gate terminal, for example from a logic-high to a logic-low. In some embodiments, at least one of switches S1-S8 may be turned off in response to a signal from control circuitry 112, where such a signal may be issued in response to a sudden stop condition. In some embodiments, switches S1-S8 may be wide bandgap (WBG) based power semiconductors, such gallium nitride (GaN) or silicon carbide (SiC) based semiconductors. In some embodiments, switches S1-S8 may include other types of metal-oxide-semiconductor field-effect transistors (MOSFETs). As shown, each of the switches S1-S8 includes an anti-parallel diode. Additionally, as understood by those skilled in the art, each of the switches S1-S8 includes an output capacitance (e.g., dependent on the operating voltage of the switch), and control circuitry 112 may further operate the switches to compensate for effects of the output capacitance.

In some embodiments, the PEM 105 is configured to transmit and receive status signals 230. These status signals may indicate an operating condition of the PEM 105, an operating condition of one or more additional PEMs coupled to the output of PEM 105, a status of an external device coupled to the PEM 105, or any combination thereof. In some embodiments, the status signals 230 are transmitted via electronic communications protocols including Modbus, CAN bus, DNP3, TCP/IP, other suitable protocols, or any combination thereof. In some embodiments, status signals 230 are transmitted to a PEM coupled in parallel to PEM 105, a main controller of PEM 105 (which may also control additional PEMs coupled in parallel to PEM 105), an external device (e.g., a facility monitoring system, alarm system, grid monitoring system, circuit breaker, smart phone, computer, tablet, IoT device, or any other suitable device), a cloud storage entity (e.g., a charger management platform), any other suitable receiving device, or any combination thereof.

In some embodiments, temperature sensors 224-1, 224-2, 224-3, 224-4, 224-5, 224-6, 224-7, and 224-8 (collectively referred to as temperature sensors 224), are coupled to, and configured to measure the temperatures of, switches S1, S2, S3, S4, S5, S6, S7, and S8, respectively. Temperature sensors 224-1, 224-2, 224-3, 224-4, 224-5, 224-6, 224-7, and 224-8, output to control circuitry 112 signals ($S_{TEMP}(1)$ through $S_{TEMP}(8)$, collectively, $S_{TEMP}(1:8)$) indicating sensed temperatures of switches S1 through S8, respectively. In some embodiments, data from one or more temperature sensors 224-1, 224-2, 224-3, 224-4, 224-5, 224-6, 224-7, and 224-8 may be used to identify a sudden stop condition. Complete signal paths from output ports $S_{TEMP}(1)$ through $S_{TEMP}(8)$ of temperature sensors 224-1, 224-2, 224-3, 224-4, 224-5, 224-6, 224-7, and 224-8 to temperature input port 211 ($S_{TEMP}(1:8)$) of control circuitry 112 are omitted from FIG. 2 for clarity. Nonetheless, output ports $S_{TEMP}(1)$ through $S_{TEMP}(8)$ of temperature sensors 224-1, 224-2, 224-3, 224-4, 224-5, 224-6, 224-7, and 224-8 are indeed coupled to temperature input port 211 ($S_{TEMP}(1:8)$) of control circuitry 112 via a signal bus or other suitable respective signal paths. In some embodiments, one or more of temperature sensors 224 may be omitted. For example, in some embodiments, only a single temperature sensor may be provided for each leg or for each side of DAB converter 114. In some embodiments, PEM status signals 230 may include data from one or more temperature sensors 224-1, 224-2, 224-3, 224-4, 224-5, 224-6, 224-7, and 224-8.

In some embodiments, current sensor 229 is configured to sense output current (i_OUT) of PEM 105 and output to control circuitry 112 a signal indicating the output current as is delivered to output power 130. A signal from current sensor 229 may be used to detect a sudden stop condition (e.g., a drop in output current and/or a negative output current), as further described below. A voltage sensor may be coupled in parallel to current sensor 229 to measure an output voltage (v_OUT) of PEM 105, and a signal from such a voltage sensor may be used to detect a sudden stop condition (e.g., a rise in output voltage), as further described below.

In some embodiments, current sensor 219 is configured to sense an output current ($I_{DC\_OUT}$). Current sensor 219 may be configured the same as current sensor 229, including to be used by control circuitry 112 to detect a sudden stop condition. Voltage sensor 221 may be coupled in parallel to current sensor 219 to measure an output voltage ($V_{DC\_OUT}$) of PEM 105, and a signal from voltage sensor 221 may also be used to detect a sudden stop condition (e.g., a rise in output voltage).

In some embodiments, current sensor 226 is configured to sense the current across the secondary side of transformer 218 and output to control circuitry 112 a signal indicating the secondary side transformer current. In some embodiments, a signal from current sensor 226 (with or without the signal from current sensor 219) may be used to detect a sudden stop condition (e.g., a drop in output current and/or a negative output current). In some embodiments, a voltage sensor may be coupled in parallel to current sensor 226 or in another suitable location to measure a transformer voltage. In some embodiments, with or without the signal from voltage sensor 221, such a voltage sensor may be used to detect a sudden stop condition (e.g., a rise in output voltage).

In some embodiments, current sensor 225 is configured to sense the current across the primary side of transformer 218 and output to control circuitry 112 a signal indicating the primary current. In some embodiments, a signal from current sensor 225 (with or without the signal from current sensor 219) may be used to detect a sudden stop condition (e.g., a drop in output current and/or a negative output current). In some embodiments, a voltage sensor may be coupled in parallel to current sensor 225 or in another suitable location to measure a transformer voltage. In some embodiments, with or without the signal from voltage sensor 221, such a voltage sensor may be used to detect a sudden stop condition (e.g., a rise in output voltage).

Control circuitry 112 includes memory interface port 208, first input port 210 ($V_{IN\ Probe}$), temperature input port 211, second input port 212 ($V_{OUT\ Probe}$), current input port 213, and multiple output ports 214. Control circuitry 112 is configured to transmit and receive instructions, settings, rules, and/or other types of data to and from memory 111 via memory interface port 208. Control circuitry 112 is configured to sense an input voltage ($V_{IN}$) of DAB converter 114 via first input port 210 ($V_{IN\ Probe}$). Control circuitry 112 is configured to sense an output voltage ($V_{OUT}$) of DAB converter 114 via second input port 212 ($V_{OUT\ Probe}$). In some embodiments, the signal from second input port 212 ($V_{OUT\ Probe}$) may be used to detect a sudden stop condition (e.g., a rise in output voltage). Control circuitry 112 is configured to sense a temperature of one or more of switches S1-S8. Control circuitry 112 is configured to sense primary current iL via current input port 213. In some embodiments, current input port 213 is configured to sense a zero current crossing (e.g., when current sensor 225 implements a current zero crossing detector).

Output ports 214 include primary switching control ports $S1_{CTL}$, $S2_{CTL}$, $S3_{CTL}$, and $S4_{CTL}$, by which control circuitry 112 provides respective switch control signals to respective switching control ports $S1_{CTL}$, $S2_{CTL}$, $S3_{CTL}$, and $S4_{CTL}$ of primary side switches S1, S2, S3, and S4. Output ports 214 also include secondary switching control ports $S5_{CTL}$, $S6_{CTL}$, $S7_{CTL}$, and $S8_{CTL}$, by which control circuitry 112 provides respective switch control signals to respective switching control ports $S5_{CTL}$, $S6_{CTL}$, $S7_{CTL}$, and $S8_{CTL}$ of secondary side switches S5, S6, S7, and S8, respectively. Complete signal paths from switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 are omitted from FIG. 2 for clarity. Nonetheless, switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 are indeed coupled to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 via respective signal paths. In some embodiments, control circuitry 112 is configured to cause switch control signals (e.g., switch control signals $S1_{CTL}$, $S2_{CTL}$, $S3_{CTL}$, $S4_{CTL}$ of primary side bridge 220, and/or switch control signals $S5_{CTL}$, $S6_{CTL}$, $S7_{CTL}$, and $S8_{CTL}$ of secondary side bridge 222) to switch according to a switching sequence that realizes zero voltage switching over a wide operation range, while reducing switching losses.

The output of DAB 114 is coupled to a load that is configured to receive output power 130. For example, either of electric vehicle 108 or battery bank 110 may be charged using output power 130. In response to dynamic power requirements of output power 130, and in response to a sudden stop condition including a sudden interruption of the connection of output power 130, control circuitry 112 may adjust operating components of DAB 114 to protect PEM 105 from excess energy accumulation and the resulting occurrence of a failure event.

In some embodiments, types of switches and/or switch configurations that differ from those shown in FIG. 2 may be utilized (e.g., switches with source and drain terminals located in positions that are the opposite of those shown in FIG. 2, active-high switches that are enabled with a logic-high gate voltage, active-low switches that are enabled with a logic-low gate voltage, or the like). The particular switches and configurations and logic levels shown and described herein are provided as illustrative examples. The principles herein apply similarly to other types of switches and/or switch configurations. The switches relating to the examples described herein are active-high switches that are enabled (e.g., activated) with a logic-high gate voltage and are disabled (e.g., inactivated) with a logic-low gate voltage.

Although a power cabinet is illustrated and described, it should be understood that PEM 105 may be used for any power converter that transmits direct current (DC) as input, output, or middle stage power, such as to charge electric vehicle 108 or battery bank 110.

Figure 3:
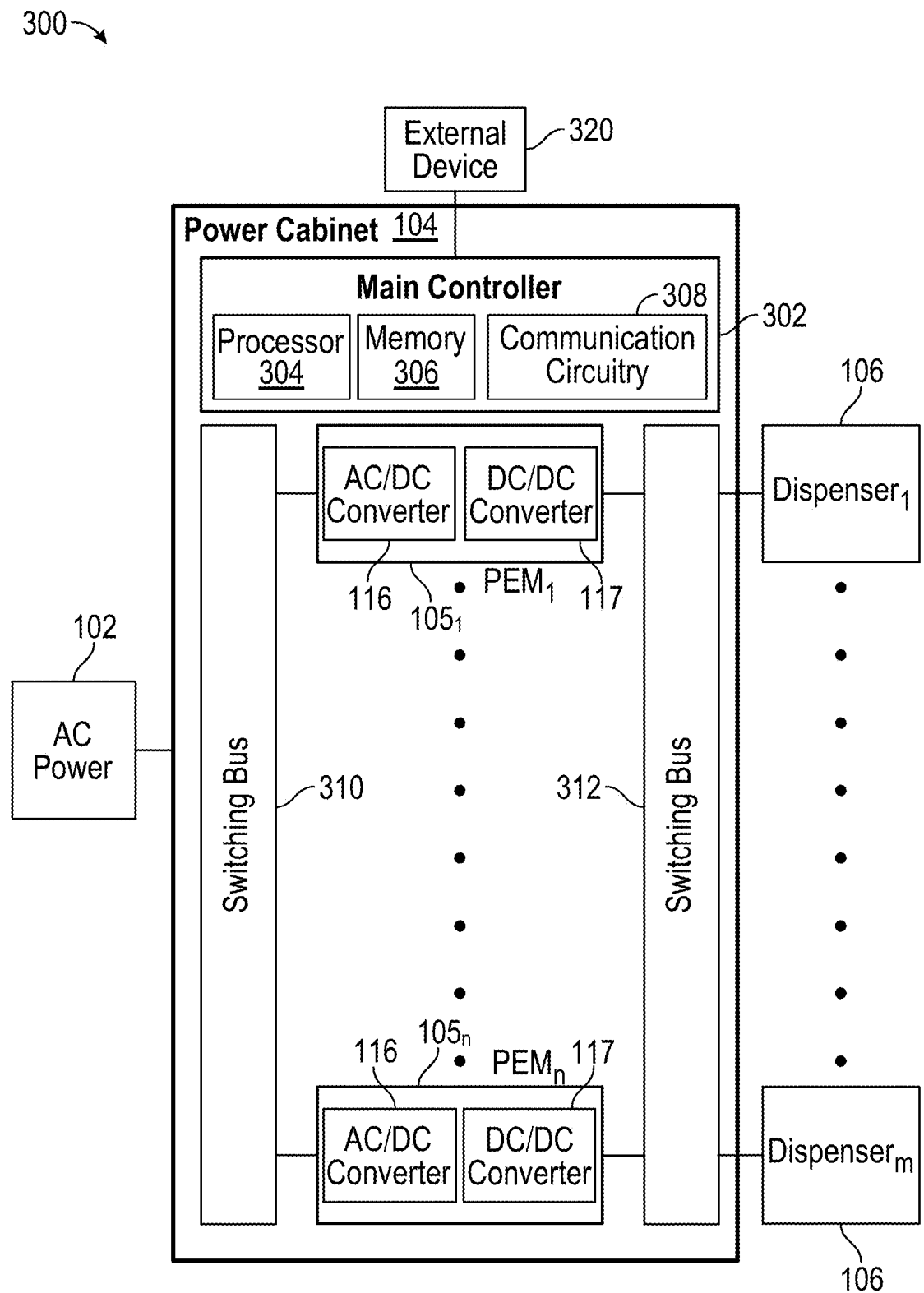
FIG. 3 is an illustrative block diagram showing additional details of some components of a power cabinet, in accordance with some embodiments of the disclosure.

FIG. 3. is an illustrative block diagram showing additional details of some components of power cabinet 104, in accordance with some embodiments of the disclosure. The power cabinet 104 includes one or more PEMs 105, main controller 302, and at least two switching buses 310 and 312. The input of power cabinet 104 is coupled to AC power 102 via switching bus 310. The output of power cabinet 104 is coupled to one or more dispensers 106 via switching bus 312. One or more PEMs 105 each include a respective AC/DC converter 116 and DC/DC converter 117. According to instructions from main controller 302, which may be executed by processor 304 and stored in memory 306, each PEM $105_{1-n}$ may be coupled to any one of dispensers $106_{1-m}$ during a given charging operation. In some embodiments, such as to increase the power output provided to a single dispenser 106, multiple PEMs 105 may simultaneously coupled in parallel to a single dispenser 106 and provide it with a net power output, where the respective power output of each PEM 105 may be summed to a net power output through switching bus 312.

Main controller 302 of power cabinet 104 additionally includes communication circuitry 308. Communication circuitry 308 may be configured to at least communicate with each PEM 105 within power cabinet 104 and with an external device (e.g., a facility monitoring system, alarm system, grid monitoring system, circuit breaker, smart phone, computer, tablet, IoT device, other power cabinet 104, a load receiving output power 130, charger management system, or any other suitable device). While main controller 302 may control the charging operation of each PEM 105, main controller 302 may not be able to identify and react in sufficient time to turn off a PEM during a sudden stop condition, for example, due to communication latency between PEMs 105 and main controller 302. Therefore, the PEMs $105_{1-n}$ may be configured to identify and react to sudden stop conditions. Following such a sudden stop condition or other potential failure event, communication circuitry 308 may be configured to receive at least one PEM status signal 230 indicative of the response to the sudden stop condition or other potential failure event by the corresponding PEM. In response to receiving PEM status signal 230, communication circuitry 308 may be configured to communicate the information of status signal 230 to one or more external devices 320 (e.g., a facility monitoring system, alarm system, grid monitoring system, circuit breaker, smart phone, computer, tablet, IoT device, or any other suitable device, a cloud storage entity, a charger management platform, any other suitable receiving device, or any combination thereof).

Figure 4:
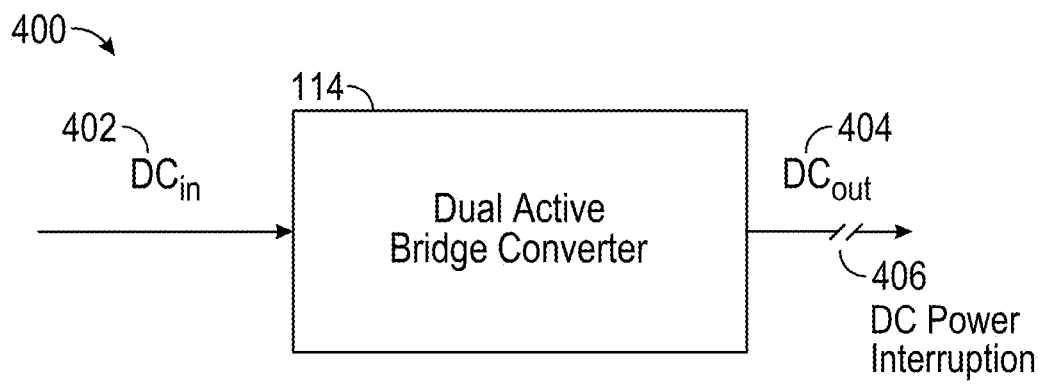
FIG. 4 depicts an illustrative sudden stop condition based on a DC power interruption, in accordance with some embodiments of the present disclosure.

FIG. 4 depicts an illustrative sudden stop condition 400 based on a DC power interruption 406, in accordance with some embodiments of the present disclosure. Under normal operation, DAB converter 114 (e.g., within PEM 105) receives a DC power input 402 and supplies a DC power output 404. Under certain conditions (e.g., when an electric vehicle 108 or battery bank 110 receiving DC power output 404 is suddenly unplugged), normal operation may be interrupted by a DC power interruption 406. Immediately following such an interruption, DC power input 402 may continue to flow through DAB converter 114 despite the absence of any device coupled to receive DC power output 404. Therefore, DAB converter 114, as well as PEM 105, power cabinet 104, and additional equipment coupled to or near power cabinet 104, may be at risk to accumulate the energy of DC power input 402, which may cause a failure event. Provided herein are systems and related processes for preventing such failure events in DAB converter 114, PEM 105, power cabinet 104, and additional equipment coupled to or near power cabinet 104.

Figure 5:
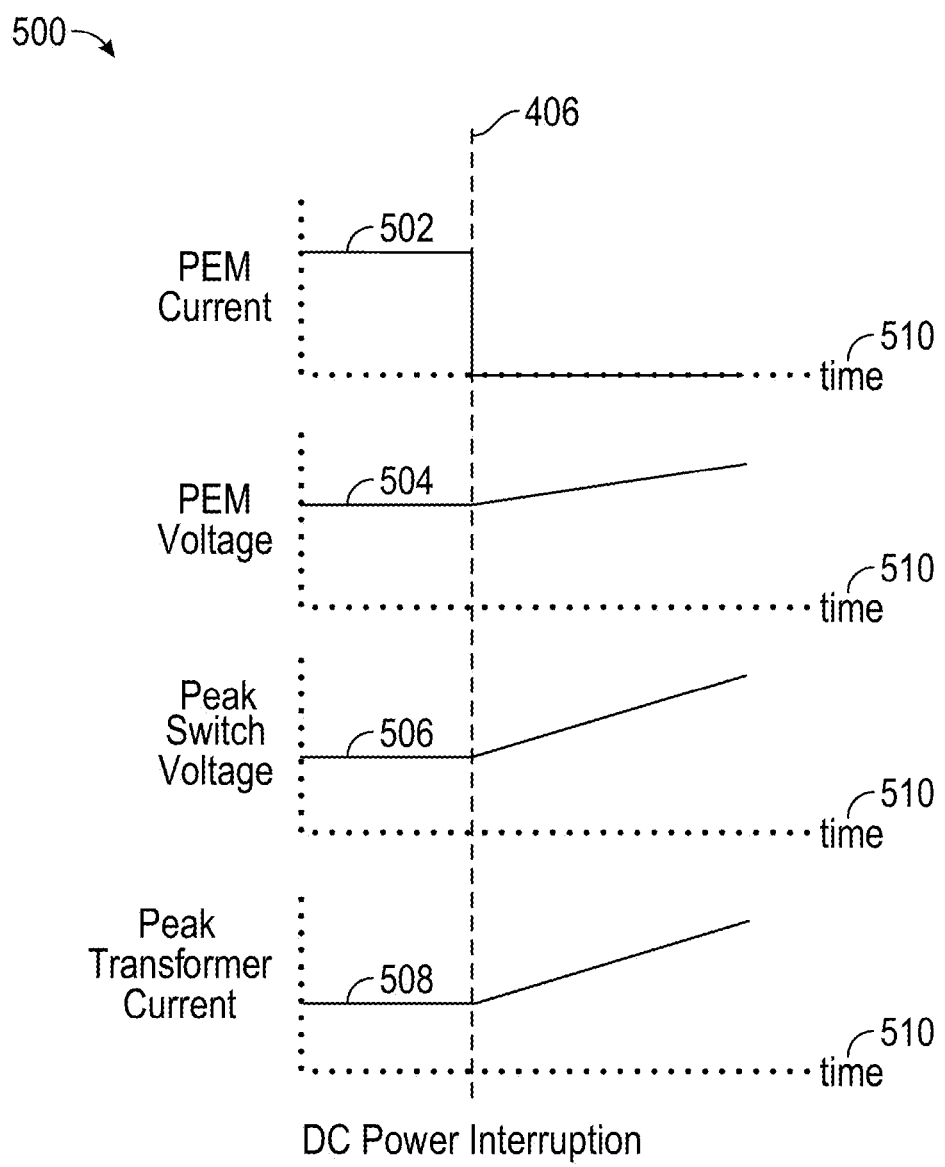
FIG. 5 depicts illustrative waveforms of operating conditions of a PEM before and after a DC power interruption without the power protections of the present disclosure.

FIG. 5 depicts illustrative waveforms 500 of operating conditions of a PEM 105 before and after a DC power interruption 406 without the power protections of the present disclosure. In some embodiments, the waveforms 500, particularly around time 406, correspond to the sudden stop condition 400. Prior to sudden stop condition 406, PEM current 502, PEM voltage 504, peak switch voltage 506, and peak transformer current 508 are stable and constant values. Waveforms 506 and 508 refer to peak values because these signals may oscillate according to the switching scheme of PEM 105 and DAB converter 114, so the waveforms depict peak values of such oscillatory signals. In some embodiments, PEM current 502 and PEM voltage 504 correspond to the PEM 105 power output received by switching bus 312, and switch voltage 506 and transformer current 508 respectively correspond to the voltage of at least one of the switches S1-S8 and the current across transformer 218.

As shown by waveforms 500, in response to DC power interruption 406, PEM current 502 reduces to zero (because there is no device to receive DC output power 404) while PEM voltage 504, switch voltage 506, and transformer 508 all begin to increase (because DAB converter 114 continues to drive output power). These waveforms 504, 506, and 508 continue to increase with time 510, which can damage DAB converter 114 or associated circuitry of PEM 105. Accordingly, operation of the PEM 105 may be adjusted in accordance with the present disclosure prior to any one or more of the signals 504, 506, or 508 exceeding an over voltage or over current limit associated with the power electronic components of PEM 105.

Figure 6:
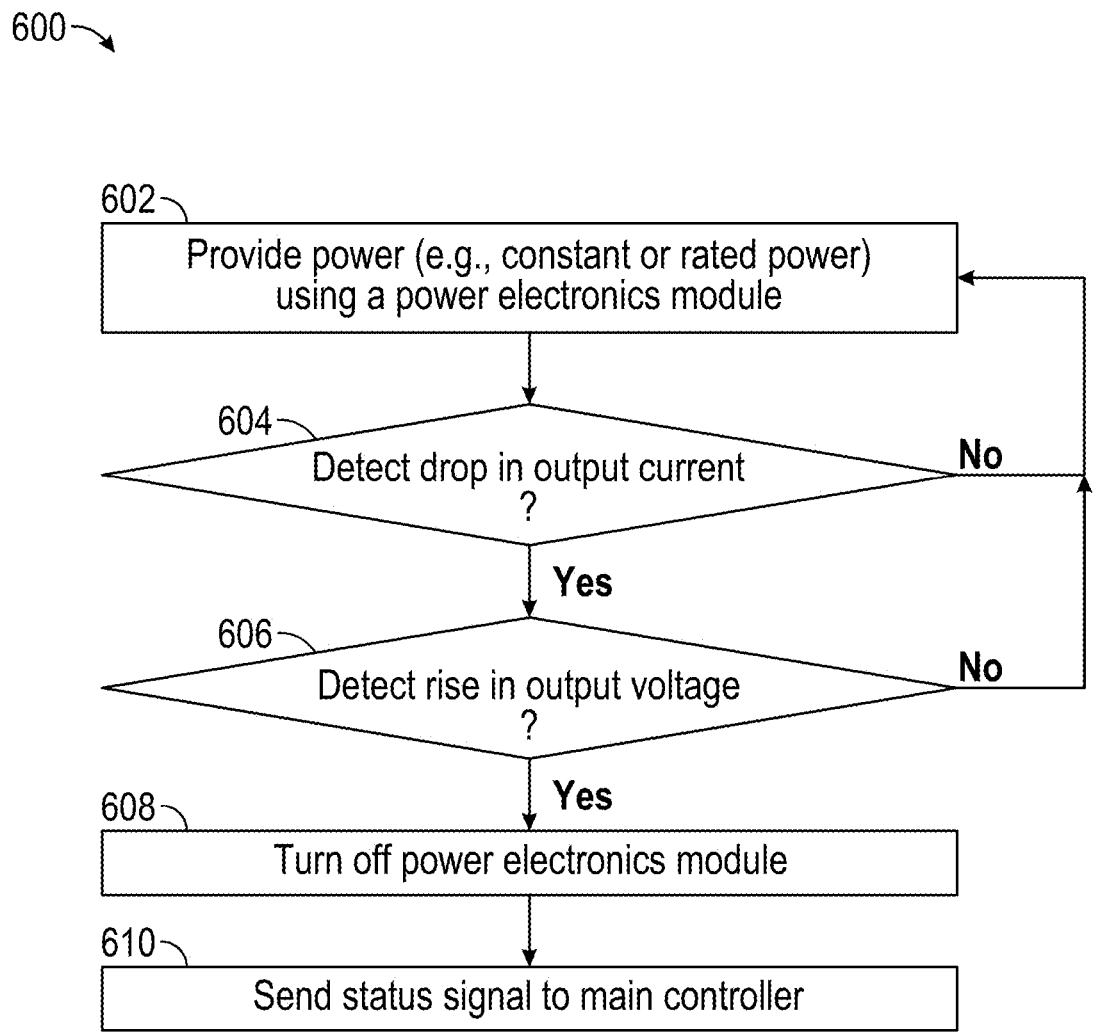
FIG. 6 depicts an illustrative flowchart of a first control process of a PEM, in accordance with some embodiments of the present disclosure.

FIG. 6 depicts an illustrative flowchart 600 of a control process of PEM 105, in accordance with some embodiments of the present disclosure. In some embodiments, this control process may correspond to operation of PEM 105 before and after sudden stop condition 400. At 602, PEM control circuitry 112 controls PEM 105 to provide power (e.g., a constant or rated power) using a power electronics module (e.g., PEM 105). In some embodiments, this power level maintains a stable output while adjusting based on the state of charge of a device receiving the power (e.g., electric vehicle 108 or battery bank 110). For example, the change in power output level may be much faster than the change in the device's state of charge. In some embodiments, when a state of charge is low, the power level may be increased to realize faster charging; when a state of charge is high, the power level may be decreased to avoid overcharging a device. In some embodiments, rules 206 of memory 111 may include one or more look-up tables or other instruction sets for determining an appropriate level of rated power delivery based on the state of charge of a device receiving the power, an amount of time the device receiving the power will be plugged in, dynamic electricity costs, other contextual information, or any combination thereof.

At 604, PEM control circuitry 112 detects whether a drop in output current has occurred (e.g., in response to a DC power interruption 406). If a drop in output current has not occurred, then PEM control circuitry 112 continues to provide the power at 602. In some embodiments, PEM control circuitry 112 may determine that a drop in output current has occurred. For example, PEM memory 111 may store a previous output current value and PEM control circuitry 112 may detect a drop in output current based on a sensed output current being less than the previous output current. The previous output current value may correspond to a value recorded in the previous sampling cycle, a value recorded at a predetermined length of time or number of cycles preceding the sensed measurement, an average of previous values over a number of samples or time, or any other suitable approach. Rules 206 of PEM memory 111 may define a drop in output current based on a percentage drop or an absolute drop between a previous output current and a sensed output current. Rules 206 of PEM memory 111 may also define a time or sampling interval over which a current drop occurs to cause PEM control circuitry 112 to make the determination that the current drop has occurred. For example, PEM control circuitry 112 may determine that a drop in output current has occurred when the sensed current continues to drop over a number of sampling cycles (e.g., 3, 4, 5, 6, 7, 8, 9 or more sampling cycles) without recovering. For example, PEM control circuitry 112 may determine that a drop in output current has occurred based on measurements recoded over 5 sampling cycles of the output current. In some embodiments, such sampling may occur at the same rate of DAB converter switching (e.g., 50 kHz) or at a higher rate.

If PEM control circuitry 112 determines that a drop in output current has occurred, then at 606, it detects whether a rise in output voltage has occurred. If a rise in output voltage has not occurred, then PEM control circuitry 112 continues to provide the power at 602. In some embodiments, PEM control circuitry 112 may determine that a rise in output voltage has occurred. For example, PEM memory 111 may store one or more previous output voltage values and PEM control circuitry 112 may detect a rise in output voltage based on a sensed output voltage being more than the previous output voltage. The previous output voltage value may correspond to a value recorded in the previous sampling cycle, a value recorded at a predetermined length of time or number of cycles preceding the voltage measurement, or any combination thereof. Rules 206 of PEM memory 111 may define a rise in output voltage based on a percentage voltage increase or an absolute voltage increase between a previous output voltage and a sensed voltage. Rules 206 of PEM memory 111 may also define a time or sampling interval over which a voltage rise occurs to cause PEM control circuitry 112 to make the determination that the voltage rise has occurred. For example, PEM control circuitry 112 may determine that a rise in output voltage has occurred when the rise is recorded over a certain amount of time or sampling cycles (e.g., 0.01, 0.04, 0.07, 0.14, 0.25, 0.6, 0.7, 0.8, 0.9, 1.0 or more ms, or 3, 4, 5, 6, 7, 8, 9, or more sampling cycles). For example, PEM control circuitry 112 may determine that a rise in output voltage has occurred when voltage continues to increase for 0.5 ms.

If PEM control circuitry 112 determines that a rise in output voltage has occurred, then at 608, it turns off PEM 105. In some embodiments, turning off PEM 105 includes turning off at least one switching element of DAB converter 114 (e.g., at least one of switches S1-S8). Turning off at least one switching element of DAB converter 114 may protect circuitry of PEM 105, other PEMs connected in parallel with PEM 105, other power electronics connected to PEM 105, power cabinet 104, dispenser 106, or other circuitry coupled to or near PEM 105.

At 610, in response to turning off the PEM 105, control circuitry 112 sends a status signal 230 to the main controller 302. Under such conditions, the status signal 230 may include information indicative of the sudden stop condition (i.e., the drop in output current at 604 and the rise in output voltage at 606) and the corresponding response (i.e., turning off the PEM 105 at 608). In some embodiments, the status signal 230 may additionally include information indicative of the status of circuitry within PEM 105 (e.g., information indicating that no circuit components were damaged).

Figure 7:
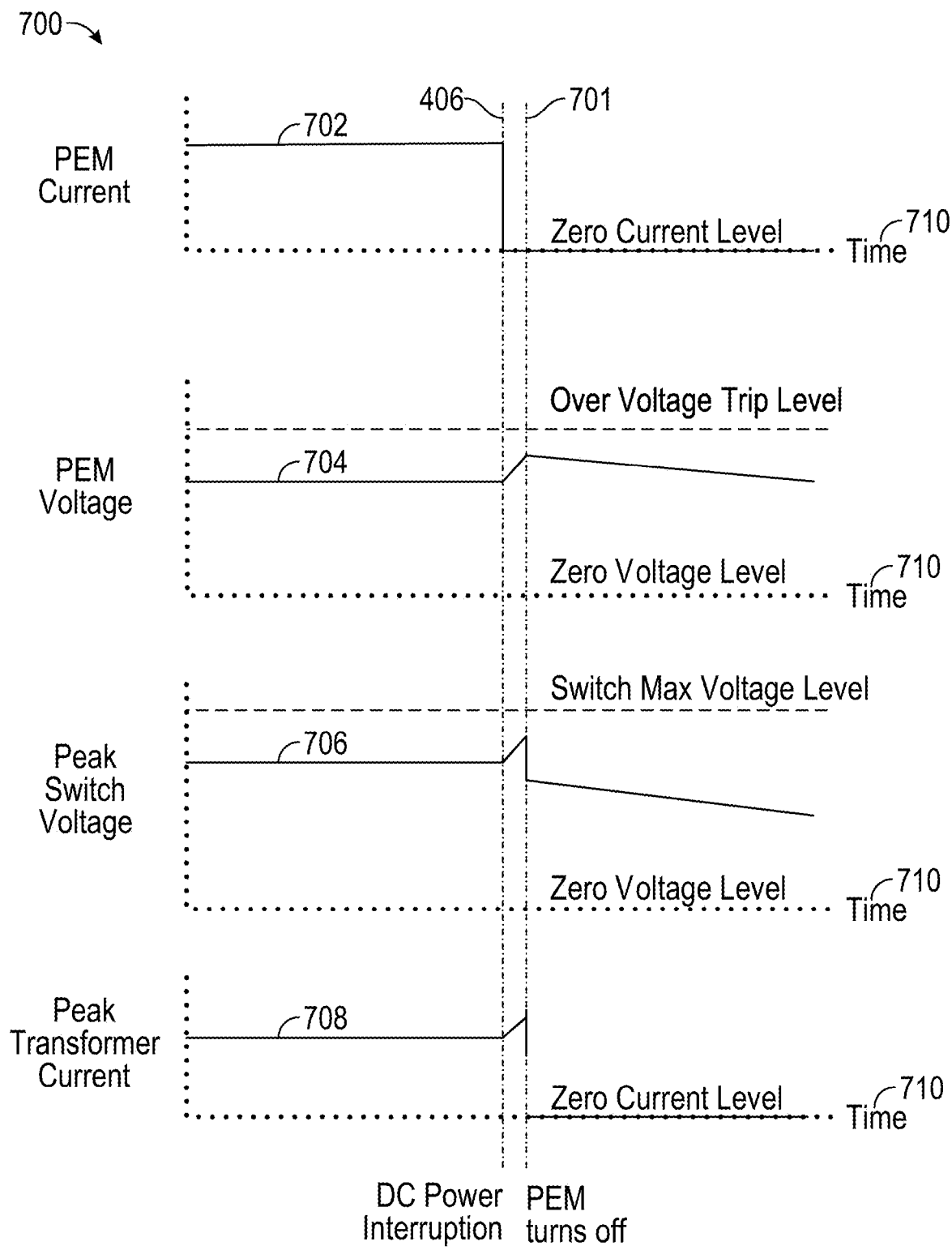
FIG. 7 depicts illustrative waveforms of operating conditions of a PEM before and after a first sudden stop condition, in accordance with some embodiments of the present disclosure.

FIG. 7 depicts illustrative waveforms 700 of operating conditions of a PEM 105 before and after a first sudden stop condition 400, in accordance with some embodiments of the present disclosure. Prior to the time when the PEM turns off 701, the waveforms 702, 704, 706, and 708 respectively correspond to the waveforms 502, 504, 506, and 508. After the time when the PEM turns off 701, the PEM voltage 704, peak switch voltage 706, and peak transformer current 708 all reduce, with the latter reducing to the zero current level. As shown, during no moment of time 710 does the PEM voltage 704 exceed the over voltage trip level, nor does the peak switch voltage 706 exceed the switch max voltage level. Therefore, in response to a sudden stop condition, circuitry of the PEM has been protected by the control process shown in flowchart 600.

Figure 8:
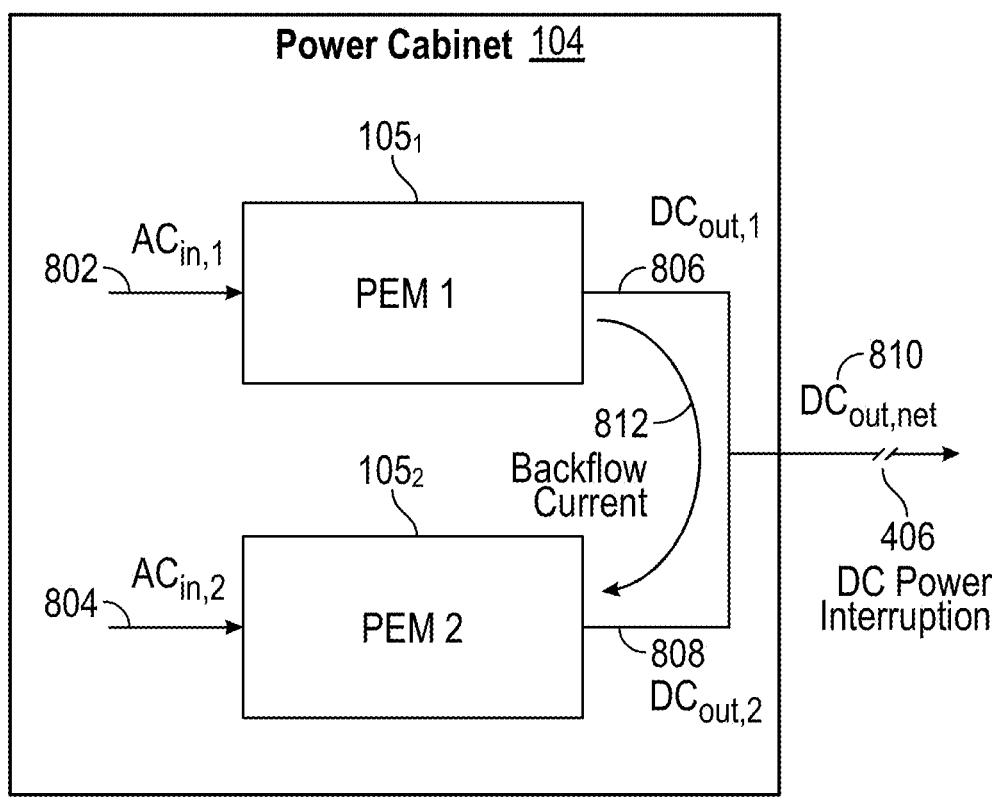
FIG. 8 depicts an illustrative sudden stop condition based on a DC power interruption during operation of two PEMs electrically coupled in parallel, in accordance with some embodiments of the present disclosure.

FIG. 8 depicts an illustrative sudden stop condition 800 in response to a DC power interruption 406 during operation of two PEMS electrically coupled in parallel, in accordance with some embodiments of the present disclosure. Included within power cabinet 104 are PEMs 1 and 2, respectively denoted $105_1$ and $105_2$, which respectively receive input powers $AC_{in,1}$ 802 and $AC_{in,2}$ 804 and supply output powers $DC_{out,1}$ 806 and $DC_{out,2}$ 808. In some embodiments, $DC_{out,1}$ 806 and $DC_{out,2}$ 808 are summed within power cabinet 104 (e.g., by switching bus 312) to provide net power output $DC_{out,net}$ 810. For example, such a summation may occur in response to instructions from main controller 302 to more rapidly charge a device connected to $DC_{out,net}$ 810 (e.g., electric vehicle 108 or battery bank 110).

During charging as illustrated in power flow diagram 800, in response to DC power interruption 406, a backflow current 812 may propagate from one PEM to another PEM. While diagram 800 shows the backflow current 812 propagating from PEM 1 $105_1$ to PEM 2 $105_2$, this backflow current 812 could also propagate from PEM 2 $105_2$ to PEM 1 $105_1$. In some embodiments, more than two PEMs 105 may be coupled and summed to a net power output $DC_{out,net}$ 810, and in response to a DC power interruption 406, any one of those PEMs 105 may receive backflow current 812 provided by at least one other of the PEMs 105. Upon receiving backflow current 812, a PEM (e.g., PEM $105_2$), as well as power cabinet 104, and additional equipment coupled to or near power cabinet 104, may be at risk to accumulate the energy of backflow current 812, which may cause a failure event. Provided herein are systems and related processes for preventing such failure events in a PEM (e.g., PEM $105_2$) receiving a backflow current 812, a PEM (e.g., PEM $105_1$) supplying a backflow current 812, power cabinet 104, and additional equipment coupled to or near PEMS $105_1$ and $105_2$ and power cabinet 104.

Figure 9:
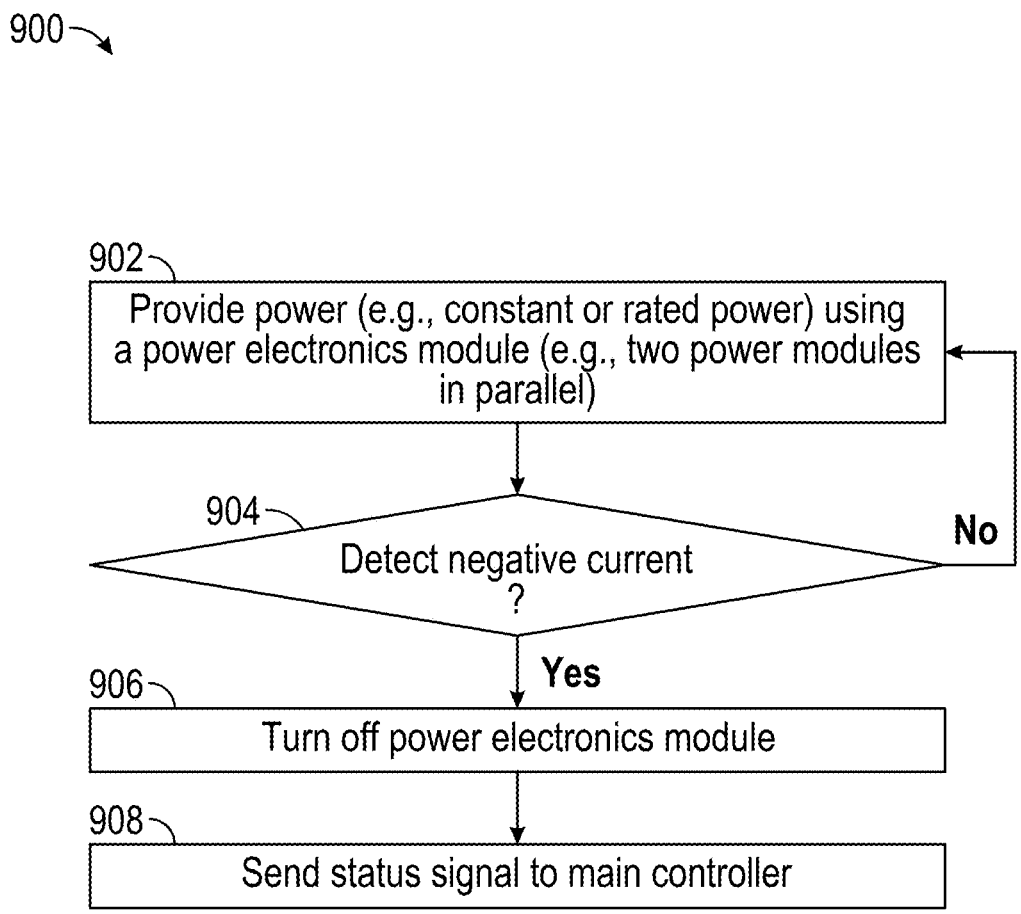
FIG. 9 depicts an illustrative flowchart of a second control process of a PEM, in accordance with some embodiments of the present disclosure.

FIG. 9 depicts an illustrative flowchart 900 of a second control process of PEM 105, in accordance with some embodiments of the present disclosure. In some embodiments, this control process may correspond to operation of at least one of PEMs $105_1$ or $105_2$ before and after sudden stop condition 800. In some embodiments, this control process may correspond to operating of each of PEMs 105 (e.g., each of PEM $105_1$ and PEM $105_2$ of FIG. 8). At 902, each PEM control circuitry 112 controls its respective PEM 105 to provide power (e.g., a constant or rated power) using a power electronics module. For example, main controller 302 may coordinate operation of PEMs $105_1$ and $105_2$ such that PEMs $105_1$ and $105_2$ are coupled in parallel to provide a net output power. In some embodiments, using two PEMs in parallel may double the maximum power output that can be provided to the device receiving the power (e.g., electric vehicle 108 or battery bank 110)—e.g., for more rapid charging.

At 904, PEM control circuitry 112 detects whether a negative current has occurred (e.g., in response to a DC power interruption 406 and via backflow current 812) in the PEM containing the PEM control circuitry 112. In some embodiments, a negative current is detected when a single sample of sensed current is negative. In some embodiments, a negative current is detected when the sensed current is continuously negative over a time or sampling interval. In some embodiments, a negative current is detected when a single sample of sensed current is below a negative threshold value (e.g., to account for noise in the sensor signal). If a negative output current has not occurred, then PEM control circuitry 112 continues to provide the power at 902.

If PEM control circuitry 112 determines that a negative current has occurred, then at 906, it turns off PEM 105. In some embodiments, turning off PEM 105 includes turning off at least one switching element of DAB converter 114 (e.g., at least one of switches S1-S8). Turning off at least one switching element of DAB converter 114 may protect circuitry of PEM 105, other PEMs connected in parallel with PEM 105, other power electronics connected to PEM 105, power cabinet 104, dispenser 106, or other circuitry coupled to or near PEM 105.

At 908, in response to turning off the PEM 105, control circuitry 112 sends a status signal 230 to the main controller 302. Under such conditions, the status signal 230 may include information indicative of the sudden stop condition (i.e., the negative current at 904) and the corresponding response (i.e., turning off the PEM 105 at 906). In some embodiments, the status signal 230 may additionally include information indicative of the status of circuitry within PEM 105 (e.g., information indicating that no circuit components were damaged).

Figure 10:
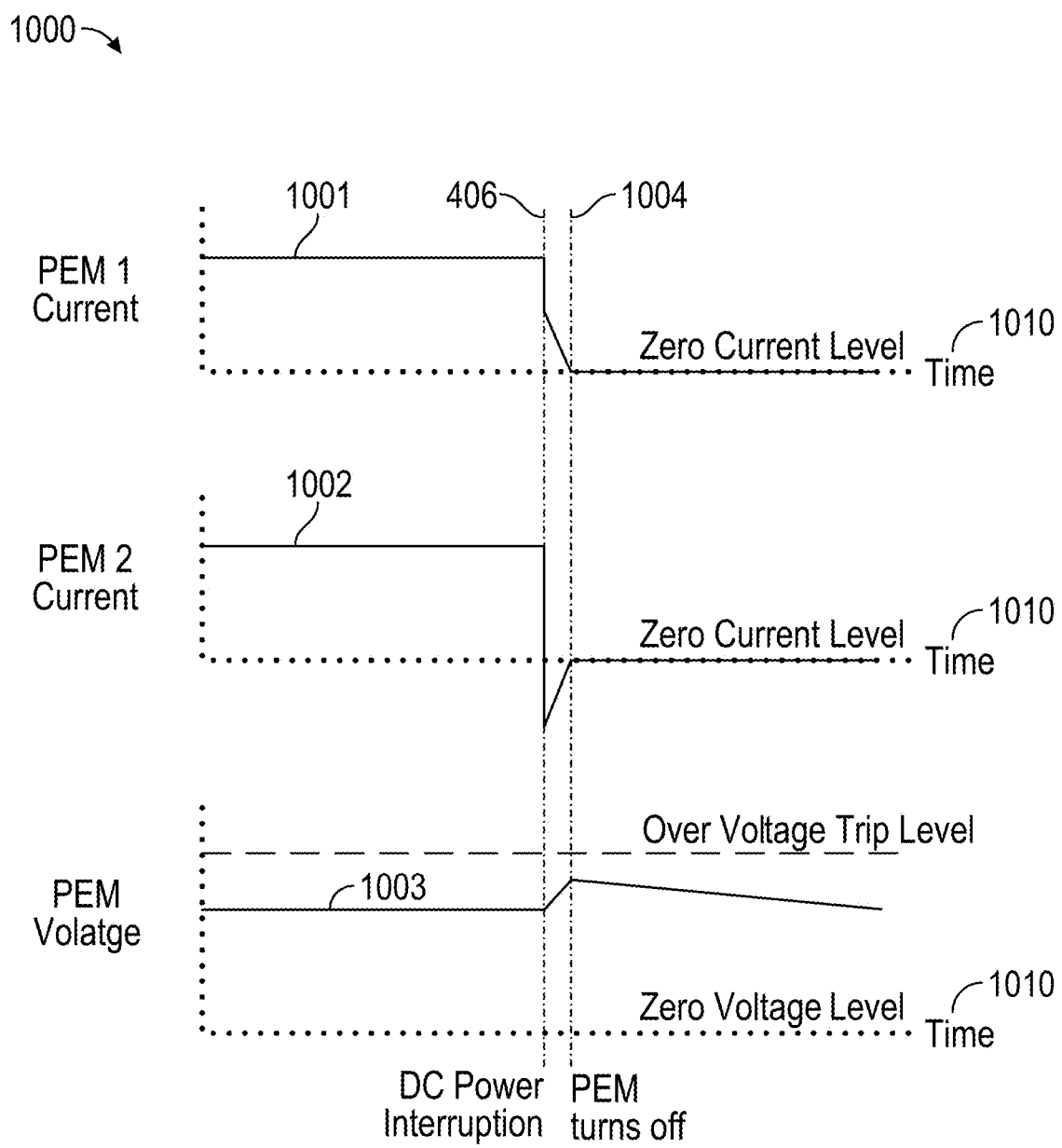
FIG. 10 depicts illustrative waveforms of operating conditions of two PEMs before and after a second sudden stop condition, in accordance with some embodiments of the present disclosure.

FIG. 10 depicts illustrative waveforms 1000 of operating conditions of two PEMs 105 before and after a second sudden stop condition 800, in accordance with some embodiments of the present disclosure. In some embodiments, PEM 1 current 1001 and PEM 2 current 1002 correspond to PEM 1 $105_1$ and PEM 2 $105_2$, and PEM voltage 1003 corresponds to $DC_{out,net}$ 810. As shown in FIG. 10, when two PEMs are coupled in parallel to provide a net power output, in response to DC power interruption 406, one of the PEM currents (e.g., PEM 1 current 1001) may reduce to a positive nonzero current while one of the other PEM currents (e.g., PEM 2 current 1002) may reduce to a negative current. Simultaneously, the net PEM voltage 1003 may rise. In response to detecting a negative value of PEM 2 current 1002, control circuitry 112 of PEM 2 may turn off PEM 2 at time 1004 (e.g., as in step 906). In some embodiments, control circuitry 112 of PEM 1 may turn off PEM 1 in parallel (e.g., as in step 608). Either PEM may turn off first, and the turning off of the first PEM may protect circuitry of the second PEM. In response to one or both PEMs turning off, after time 1004, PEM 1 current 1001 and PEM 2 current 1002 stabilize at zero current level and PEM voltage 1003 reduces. In some embodiments, PEM voltage 1003 never surpasses an over voltage trip level, indicating reliable management of the power electronics circuitry during sudden stop condition 800.

In some embodiments, PEM control processes 600 and 900 can be performed as independent processes for detecting a sudden stop condition (e.g., whether or not the PEMs are connected in parallel). In some embodiments, PEM control circuitry 112 may simultaneously perform processes 600 and 900. In some embodiments, process 900 may only be performed on PEMs connected in parallel. For example, PEM $105_1$ may run process 600 when it is independently providing a power output, and PEM $105_1$ may run processes 600 and 900 in response to being connected in parallel with another PEM 105 to provide a net power output. In the case of a PEM 105 running processes 600 and 900, these processes may be combined as shown in FIG. 11.

Figure 11:
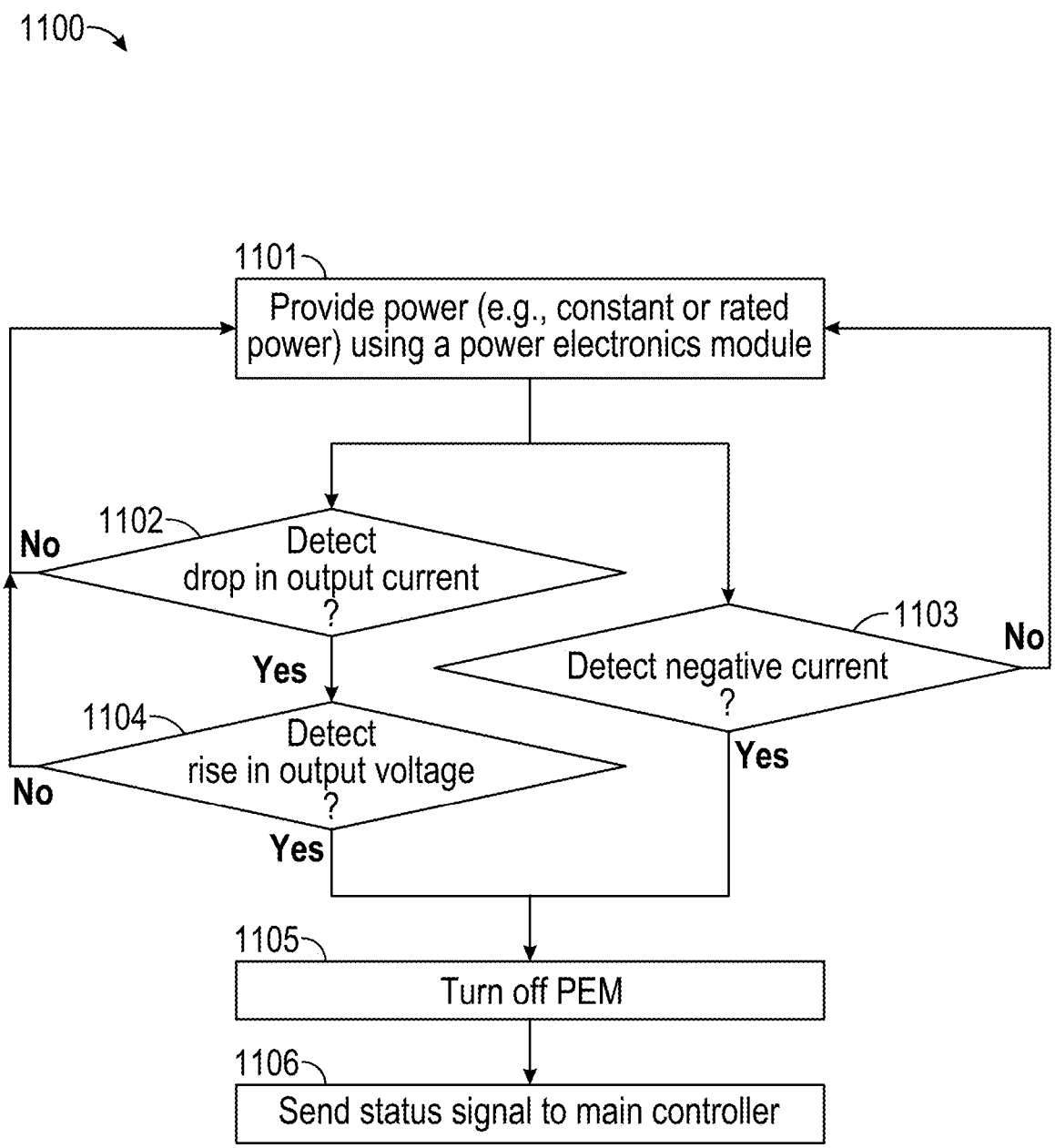
FIG. 11 depicts an illustrative flowchart of a third control process of a PEM, in accordance with some embodiments of the present disclosure.

FIG. 11 depicts an illustrative flowchart 1100 of a control process of PEM 105 in sudden stop conditions, in accordance with some embodiments of the present disclosure. At 1101, control circuitry 112 controls PEM 105 to provide power (e.g., constant or rated power). For example, the power provided at step 1101 may be as provided to DCFC dispenser 106, output power 130, $DC_{out}$ 404, $DC_{out,1}$ 806, $DC_{out,2}$ 808, or any combination thereof. At 1102, control circuitry 112 detects whether there is a drop in output current. For example, as in the drop in output current shown in PEM current 502, 702, or 1001 in response to DC power interruption 406. In parallel, at 1103, control circuitry 112 detects whether there is a negative current. For example, as in the negative current shown in PEM current 1002 in response to DC power interruption 406. If control circuitry 112 detects neither a drop in output current nor a negative current, then PEM 105 continues to provide power at 1101. If at 1102 control circuitry 112 detects a drop in output current, then at 1104 control circuitry 112 detects whether there is a rise in output voltage. For example, as in the rise in output voltage shown in PEM voltage 504, 704, or 1003 in response to DC power interruption 406. If control circuitry 112 does not detect a rise in output voltage, then PEM 105 continues to provide power at 1101. However, if control circuitry 112 detects a negative current at 1103 or a rise in output voltage at 1104, then at 1105 control circuitry 112 turns off PEM 1105. For example, as in the PEM turns off operations 701 and 1004. If PEM 105 is turned off at 1105, then at 1106 control circuitry 112 sends a status signal 230 to main controller 302. In some embodiments, status signal 230 may indicate detection of a drop in output current 1102, detection of a negative current 1103, detection of a rise in output voltage 1104, turning off PEM 1105, PEM current 702, PEM voltage 704, peak switch voltage 706, peak transformer current 708, net PEM output voltage (e.g., PEM voltage 1003), whether or not any over voltage or max voltage levels were exceeded, health status of any electronics component within PEM 105, or any combination thereof. In some embodiments, status signal 230 may additionally be sent to external device 320 (e.g., a facility monitoring system, alarm system, grid monitoring system, circuit breaker, smart phone, computer, tablet, IoT device, or any other suitable device, a cloud storage entity, a charger management platform, any other suitable receiving device, or any combination thereof).

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method comprising:
   detecting, using control circuitry, a drop in output current of a power electronics module (PEM);
   in response to detecting the drop in the output current, detecting, using the control circuitry, whether an output voltage of the PEM increases over a period of time; and
   in response to detecting that the output voltage increased over the period of time, turning off the PEM using the control circuitry.

2. The method of claim 1, wherein the PEM comprises a DC-DC converter.

3. The method of claim 2, wherein the DC-DC converter comprises a dual active bridge converter.

4. The method of claim 3, wherein turning off the PEM comprises turning off a switching element of the dual active bridge converter.

5. The method of claim 1, wherein:
   turning off the first PEM protects circuity of the PEM from an interruption of a continuous power flow; and the interruption is based on an interruption of one or more of a physical connection or an electrical connection between an electric vehicle charging port and a dispenser of the PEM.

6. The method of claim 1, wherein:
the PEM is a first PEM electrically coupled in parallel to a second PEM;
the first and second PEMs are configured to provide a net positive DC output current;
the drop in output current of the first PEM results in a negative output current; and
the method further comprises, in response to detecting the negative output current, turning off the first PEM using the control circuitry.

7. The method of claim 6, wherein a main controller monitors the first and second PEMs, the method further comprising:
transmitting a first PEM status signal to the main controller based on the first PEM being turned off; and
in response to receiving the first PEM status signal, notifying, using the main controller, an external device of the first PEM status signal.

8. The method of claim 1, wherein the output current is coupled to at least one of an energy storage device or a DC-AC converter.

9. A method comprising:
detecting, using control circuitry, a negative current at an output of a first power electronics module (PEM), wherein the first PEM is electrically coupled in parallel to a second PEM to provide a net positive DC output current;
in response to detecting the negative current at the output of the first PEM, detecting, using the control circuitry, whether a net output voltage of the first PEM and the second PEM increases over a period of time; and
in response to detecting that the net output voltage increased over the period of time, turning off the first PEM using the control circuitry.

10. The method of claim 9, wherein:
a main controller monitors the first and second PEMs;
the turning off of the first PEM further comprises transmitting a first PEM status signal to the main controller; and
in response to receiving the first PEM status signal, the main controller notifies an external device of the first PEM status signal.

11. The method of claim 9, wherein each PEM comprises a DC-DC converter, and each DC-DC converter comprises a dual active bridge converter.

12. The method of claim 9, wherein the net positive DC output current is coupled to at least one of an energy storage device or a DC-AC converter.

13. A system comprising:
a power electronics module (PEM); and
control circuitry of the PEM configured to:
detect a drop in output current of the PEM;
in response to detecting the drop in the output current, detect whether an output voltage of the PEM increases over a period of time; and
in response to detecting that the output voltage increased over the period of time, turn off the PEM.

14. The system of claim 13, wherein the PEM comprises a DC-DC converter.

15. The system of claim 14, wherein the DC-DC converter comprises a dual active bridge converter.

16. The system of claim 15, wherein the control circuitry is configured to turn off the PEM by causing a switching element of the dual active bridge converter to turn off.

17. The system of claim 13, further comprising:
a main controller coupled to the PEM and at least one additional PEM, wherein:
the control circuitry of the PEM is further configured to transmit a PEM status signal to the main controller based on the PEM being turned off; and
in response to receiving the PEM status signal, the main controller is configured to notify an external device of the PEM status signal.

18. The system of claim 13, wherein the PEM is a first PEM coupled in parallel to a second PEM to provide a net positive DC output current and wherein the control circuitry of the first PEM is further configured to:
detect a negative current at an output of the first PEM; and
in response to detecting the negative output current, turn off the first PEM.

19. The system of claim 18, wherein the negative output current of the first PEM occurs when a load stops receiving the net positive DC output current and the second PEM continues providing a positive DC output current and wherein the control circuitry of the first PEM is configured such that turning off the first PEM protects circuity of the first PEM from an interruption of a continuous power flow.

20. The system of claim 13, wherein the output current is coupled to at least one of an energy storage device or a DC-AC converter.

* * * * *